(12) United States Patent
Daigle et al.

(10) Patent No.: US 11,578,823 B1
(45) Date of Patent: Feb. 14, 2023

(54) CASING SPACER WITH ROLLER ASSEMBLY GUARDS

(71) Applicants: Damian Daigle, Rayne, LA (US); Miguel Regato, Youngsville, LA (US); W. Thomas Forlander, Lafayette, LA (US)

(72) Inventors: Damian Daigle, Rayne, LA (US); Miguel Regato, Youngsville, LA (US); W. Thomas Forlander, Lafayette, LA (US)

(*) Notice: Subject to any disclaimer, the term of this patent is extended or adjusted under 35 U.S.C. 154(b) by 0 days.

(21) Appl. No.: 17/576,723

(22) Filed: Jan. 14, 2022

Related U.S. Application Data

(60) Provisional application No. 63/138,260, filed on Jan. 15, 2021.

(51) Int. Cl.
*F16L 9/18* (2006.01)
*F16L 7/00* (2006.01)

(52) U.S. Cl.
CPC ............................. *F16L 7/00* (2013.01)

(58) Field of Classification Search
CPC ........................ F16L 3/08; F16L 7/00
USPC ................................. 138/112, 114
See application file for complete search history.

(56) References Cited

U.S. PATENT DOCUMENTS

| | | | |
|---|---|---|---|
| 1,122,130 A | 12/1914 | Lamson | |
| 1,906,209 A | 4/1933 | Harding et al. | |
| 2,531,658 A | 11/1950 | Walsh | |
| 2,706,496 A | 4/1955 | Bond | |
| 3,609,603 A | 9/1971 | Lutchansky | |
| 3,725,567 A | 4/1973 | Olsen et al. | |
| 3,786,379 A | 1/1974 | Lutchansky | |
| 3,916,081 A | 10/1975 | Floessel | |
| 4,335,267 A | 6/1982 | Hopkins | |
| 4,436,119 A * | 3/1984 | Shahan | F16L 59/12 181/207 |
| 5,441,082 A | 8/1995 | Estew et al. | |
| 5,791,380 A | 8/1998 | Onan | |
| 5,915,703 A * | 6/1999 | Wrike | A63C 17/06 301/5.307 |
| 6,003,559 A | 12/1999 | Baker | |
| 6,571,832 B1 | 6/2003 | Elliott | |
| 6,736,166 B2 | 5/2004 | Calais et al. | |
| 7,647,947 B1 | 1/2010 | Littlebrant | |
| 10,627,014 B1* | 4/2020 | Daigle | F16L 7/00 |
| 10,927,978 B1* | 2/2021 | Daigle | F16L 9/18 |
| 2009/0079147 A1* | 3/2009 | Conners | A63C 17/06 280/11.223 |

* cited by examiner

Primary Examiner — James F Hook
(74) Attorney, Agent, or Firm — Greg Mier

(57) ABSTRACT

A casing spacer that fits around a carrier pipe at various intervals along the length of the carrier pipe for the purpose of positioning the carrier pipe within a casing pipe. The casing spacer is equipped with roller assemblies on the outside surface of the casing spacer. The roller assemblies are protected by guards to help the roller assemblies avoid obstacles that may exist on the inner surface of the casing pipe.

21 Claims, 6 Drawing Sheets

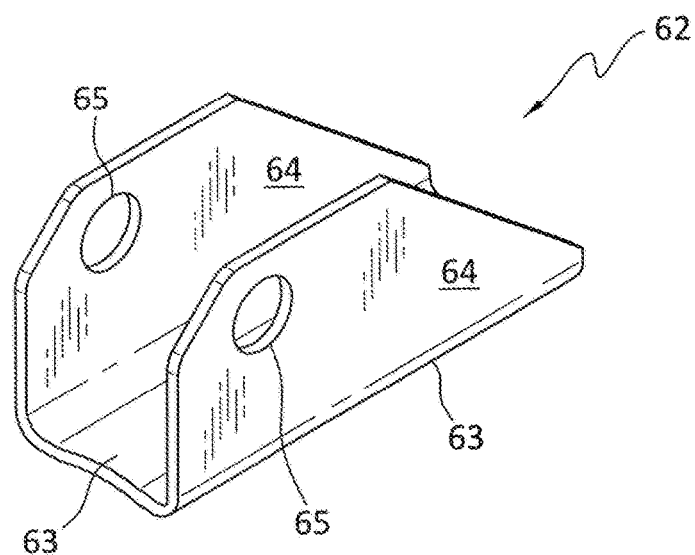
FIG. 12
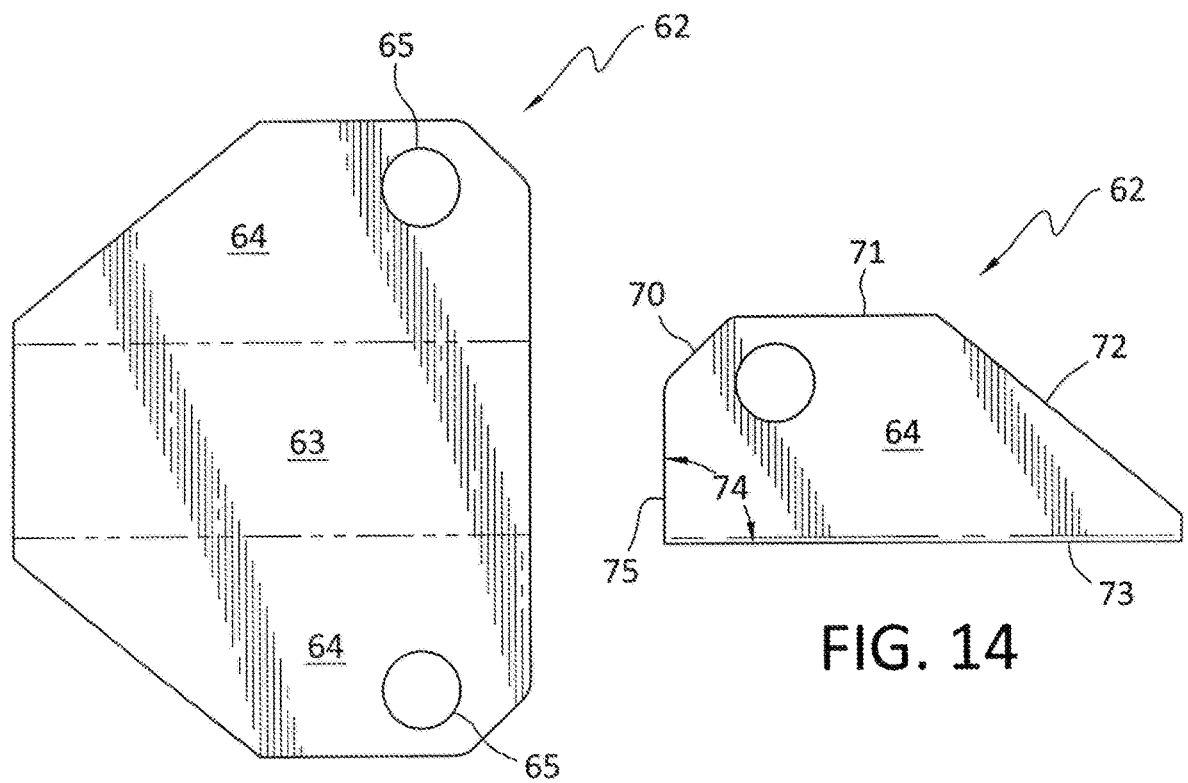
FIG. 13
FIG. 14

US 11,578,823 B1

CASING SPACER WITH ROLLER ASSEMBLY GUARDS

CROSS REFERENCE TO RELATED APPLICATIONS

The present application claims priority from provisional patent application No. 63/138,260, filed on Jan. 15, 2021.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

FIELD OF THE INVENTION

The subject invention relates to casing spacers for positioning a carrier pipe or pipes within a casing. More specifically, the subject invention relates to casing spacers equipped with roller assemblies on the outside surface of the casing spacer, where the roller assemblies are protected by guards.

BACKGROUND

The term "carrier pipe" describes a conduit used to transport fluids from one place to another. Carrier pipes can be used to transport a wide range of fluids, including petroleum products, chemicals, gases, water, and waste streams. Carrier pipes are typically, but not always, installed underground (under roads, railways, canals, rivers, etc.) where they can be exposed to dynamic and static loads, corrosive elements, vibrations, and other stressful forces. To prevent these stressful forces from damaging carrier pipes and to prolong the serviceability of carrier pipes, they are often installed inside a casing pipe.

A casing pipe is a conduit in which a carrier pipe or a plurality of carrier pipes is/are installed. A casing pipe typically has an inner diameter long enough to create an annulus between the inside surface of the casing pipe and the outside surface of the carrier pipe (or plurality of carrier pipes) installed inside the casing pipe.

When a carrier pipe or plurality of carrier pipes is/are installed inside a casing pipe, it is often desirable to maintain the carrier pipe or plurality of carrier pipes at a desired position or alignment within the casing pipe and along the length of the casing pipe. In the case of gravity flow lines, it is desirable to maintain the carrier pipe at a desired grade or position within the casing pipe and along the length of the casing pipe. Casing spacers have been invented for these purposes. Casing spacers typically fit around a carrier pipe at various intervals along the length of the carrier pipe and serve the purpose of positioning the carrier pipe within the casing pipe. In addition, casing spacers serve the purpose of electrically isolating the carrier pipe from the casing pipe to eliminate galvanic corrosion between two dissimilar metals. Where a plurality of carrier pipes is installed inside the casing pipe, casing spacers serve the purpose of electrically isolating each carrier pipe from the other carrier pipes and the casing pipe. Different types of casing spacers are equipped to support a single carrier pipe or a plurality of carrier pipes.

In the case of a single carrier pipe, a conventional casing spacer typically includes a band that is secured around the carrier pipe. Typically, a plurality of risers or supports are attached to the band. The plurality of risers or supports extend outward from the surface of the band. In the case of a plurality of carrier pipes, a conventional casing spacer is commonly a sheet of material having multiple holes and cutouts in which the plurality of carrier pipes are placed. In all cases, the casing spacers are typically placed at desired locations along the length of the carrier pipe or plurality of carrier pipes to support the carrier pipe or plurality of carrier pipes along the length of the casing pipe.

In a typical installation of a carrier pipe or a plurality of carrier pipes into a casing pipe, the string of carrier pipes or plurality of carrier pipes are either pushed or pulled into the casing pipe. Some casing spacers are equipped with rollers to make it easier to push or pull the carrier pipe into the casing pipe. Sometimes, obstacles on the inner surface of the casing pipe can make it difficult or prevent the rollers from continuing to roll along the length of the casing pipe, or can damage the rollers as they roll along the length of the casing pipe. The present invention is designed to make it easier for the rollers to overcome obstacles and continue rolling along the length of the casing pipe.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein:

FIG. 12 is an isometric view of a caster/gusset combination.

FIG. 13 is a cut out pattern for a caster/gusset combination.

FIG. 14 is a side view of a caster/gusset combination.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
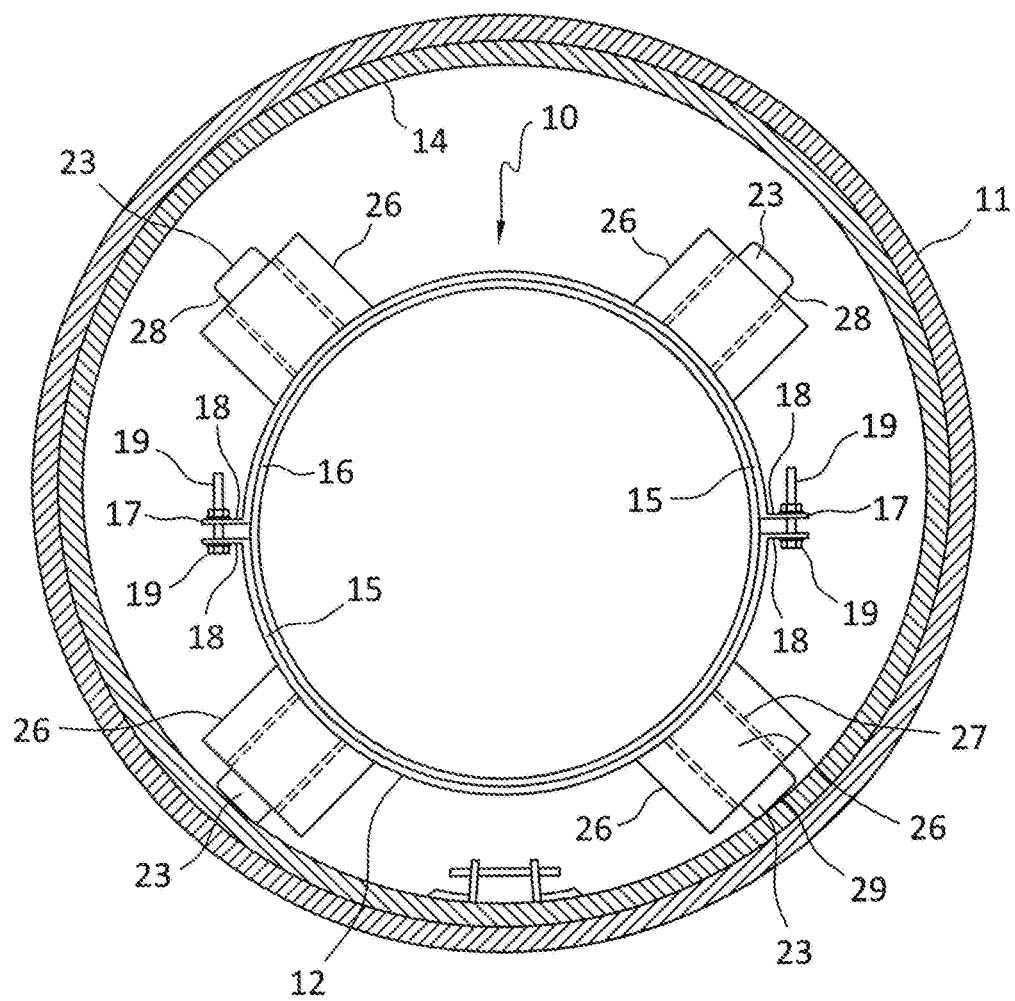
FIG. 1 is an end view of a casing spacer wrapped around a carrier pipe that is inside a casing pipe, where the casing spacer is equipped with roller assemblies protected by roller assembly guards.
Figure 2:
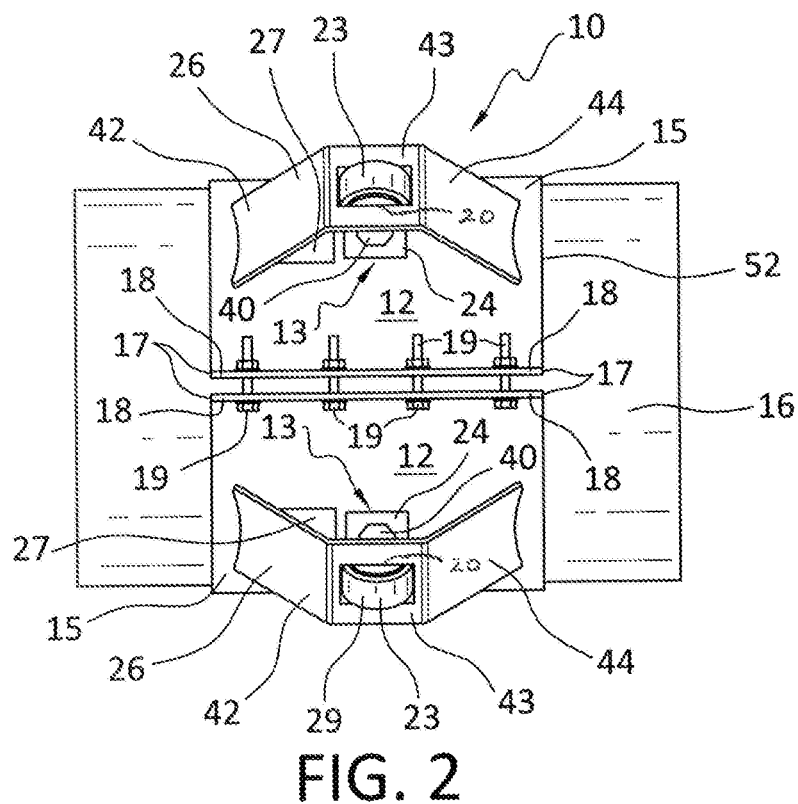
FIG. 2 is a side view of a casing spacer wrapped around a carrier pipe, where the casing spacer is equipped with roller assemblies protected by roller assembly guards.
Figure 3:
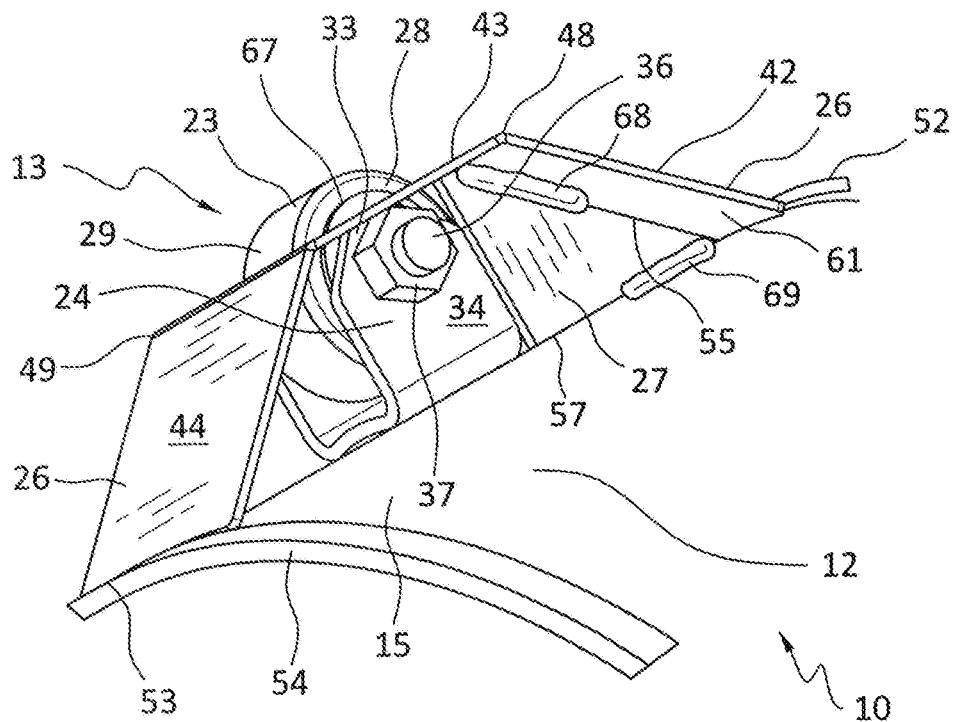
FIG. 3 is an isometric view of a casing spacer showing a roller assembly protected by a roller assembly guard.

As shown in FIGS. 1 through 3, the subject invention is a casing spacer 10 that is designed to overcome obstacles that may exist on the inner surface 14 of a casing pipe 11. Each casing spacer 10 typically includes a easing spacer band 12 with multiple roller assemblies 13 attached thereto.

Casing spacer band 12 is preferably formed from a sheet of metal, such as raw steel or stainless steel, but can be made of other materials, such as plastic. If the casing spacer band 12 is formed from a sheet of metal, then the thickness of the sheet of metal is preferably fourteen gauge, but the thickness can vary depending on the size of casing spacer 10. The width of casing spacer band 12 can vary depending on the size of carrier pipe 16 on which casing spacer 10 will be installed.

Casing spacer band 12 preferably includes two or more sections 15, depending on the size of carrier pipe 16 on which casing spacer 10 will be installed. Each section 15 of casing spacer band 12 is preferably rolled to give it a semi-circular shape to fit around carrier pipe 16, as shown in FIG. 1. Each short end 17 of the semi-circular section 15 of casing spacer band 12 is preferably bent outward and formed into a flange 18 with holes (not shown) to receive fasteners 19 to join adjacent semi-circular sections 15 of casing spacer band 12 around carrier pipe 16, as shown in FIG. 1.

The preferred embodiment of roller assembly 13 is shown in FIGS. 2 through 5. The primary components of the preferred embodiment of roller assembly 13 include one or more wheels 23, a caster 24, a bearing assembly 25 (shown in FIG. 5), a guard 26, and a gusset 27.

Each wheel 23 of the preferred embodiment of roller assembly 13 is preferably made of an electrically isolating glass-filled polymer material using injection molding or some other molding process. As shown in FIGS. 2 through 5, each wheel 23 preferably has two sides 28 and a rolling surface 29. As shown in FIG. 5 each wheel 16 is preferably equipped with a bore 30, an inner surface 31, and needle bearings 32. Needle bearings 32, which are preferably small in diameter relative to their length, can be used in pairs or alone, depending on the weight of the load to be supported by roller assembly 13.

As shown in FIG. 3, caster 24 preferably has a U-shaped cross-section with a bottom 33 and two sides 34. Caster 24 can be made from a sheet of metal such as raw steel or stainless steel. Caster 24 can be cut or punched from the sheet of metal in the desired shape and then formed or bent into a LT-shaped channel having a bottom 33 and two sides 34. Caster 24 can also be made from three separate pieces of metal that are joined together into a U-shaped channel by welding or similar method. Caster 24 is preferably shaped to provide adequate clearances between caster 24 and the sides 28 and rolling surface 29 of each wheel 23, as shown in FIG. 5. The bottom 33 of caster 24 is preferably attached to the casing spacer band 12 with the two sides 34 of caster 24 extending radially from the bottom 33 away from the casing spacer band 12, as shown in FIG. 3. Sides 34 of caster 24 have holes 35 to accommodate a bolt 36 for each wheel 23 assembled onto caster 24.

As shown in FIGS. 2, 3, and 5, each wheel 23 is assembled onto caster 24 using a bolt 36 and a nut 37. Bolt 36 and nut 37 are preferably manufactured from metal, such as carbon steel or stainless steel. Bolt 36 has a shaft 38 for inserting through the sides 34 of caster 24 and through wheel 23. For each wheel 23 assembled onto caster 24, shaft 38 of bolt 36 is inserted through a hole 35 (shown in FIG. 5) in one of the sides 34 of caster 24, then through wheel 23 so that the set of needle bearings 32 are between bolt 36 and inner surface 31 of wheel 23, and then through a hole 35 in the other side 34 of caster 24. Shaft 38 is preferably threaded at one end 39 so that nut 37 can be threaded onto shaft 38 to secure bolt 36 to caster 24. Shaft 38 is preferably unthreaded between its threaded portion and the head 40 (shown in FIG. 2) of bolt 36 to provide an unthreaded rolling surface 41 for set of needle bearings 32. Unthreaded rolling surface 41 of shaft 38 of bolt 36 should be hard enough to prevent excessive wear from the rolling of the set of needle bearings 32.

As shown in FIGS. 2 through 5, a guard 26 preferably protects the roller assembly 13 from obstacles that may exist on the inner surface 14 of the casing pipe 11. Guard 26 can be made from a sheet of metal such as raw steel or stainless steel. Guard 26 can be cut or punched from the sheet of metal in the desired shape and then formed or bent into the configuration shown in FIGS. 6, 7, and 8. Guard 26 can also be made from three separate pieces of metal that are joined together by wielding or similar method.

Figure 5:
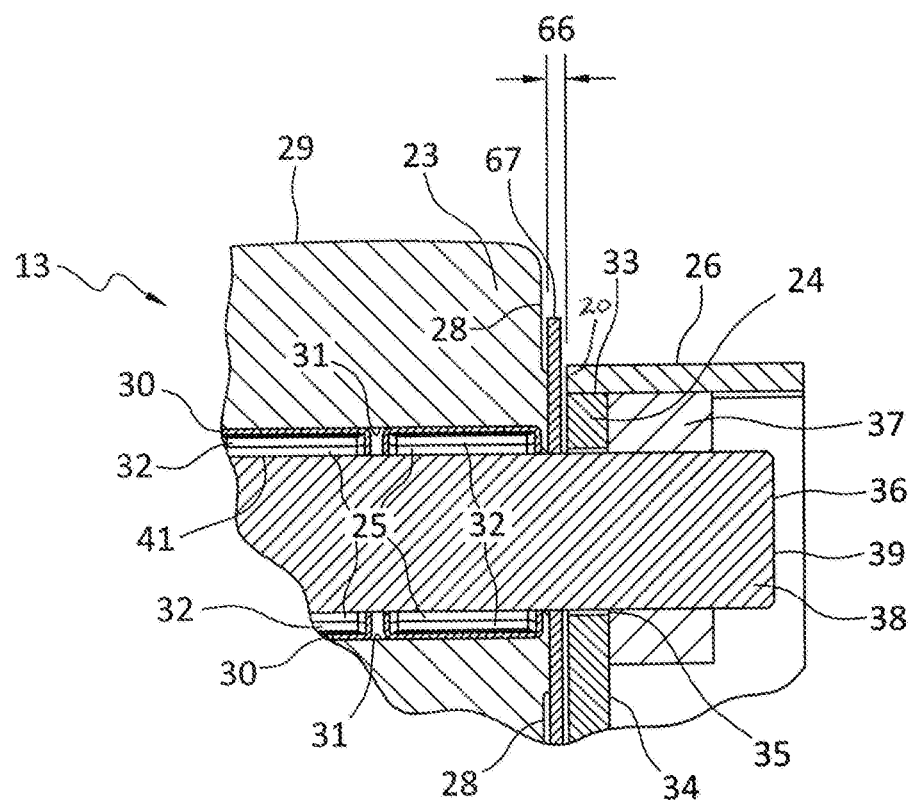
FIG. 5 is a cut-away view a roller assembly and roller assembly guard.
Figure 6:
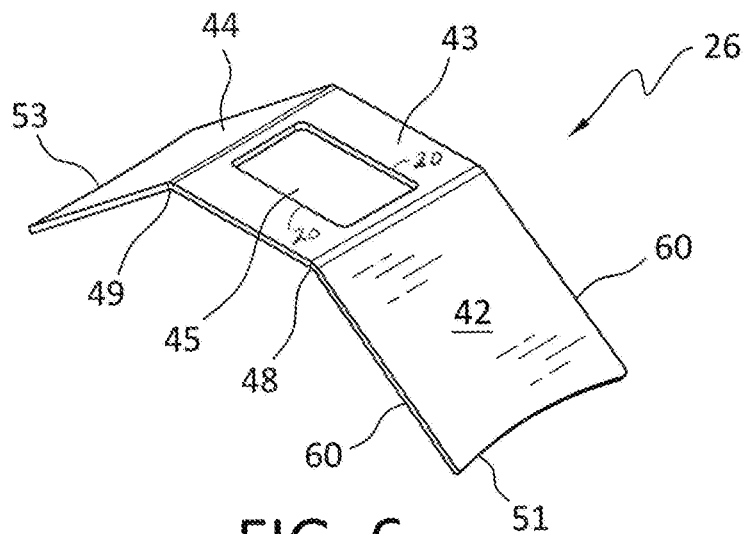
FIG. 6 is an isometric view of a roller assembly guard.
Figure 7:
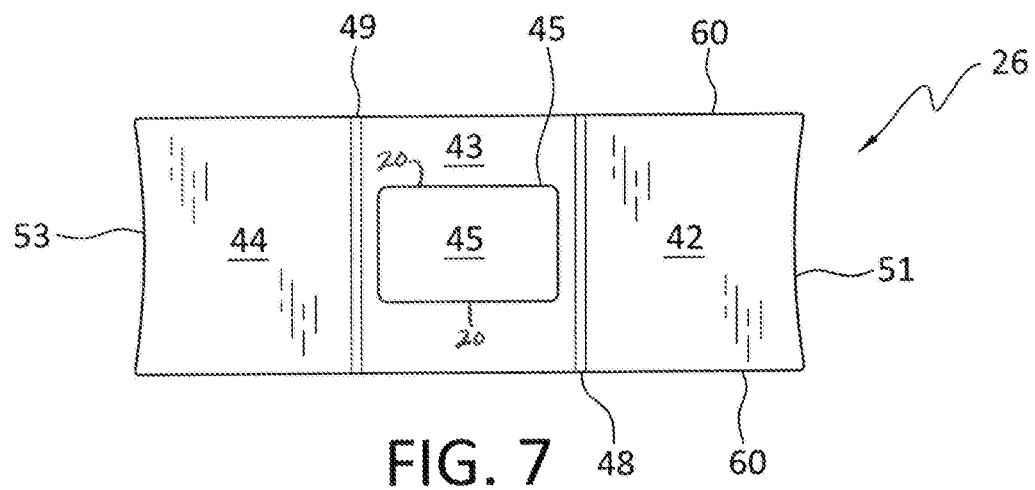
FIG. 7. is a top view of a roller assembly guard.
Figure 8:
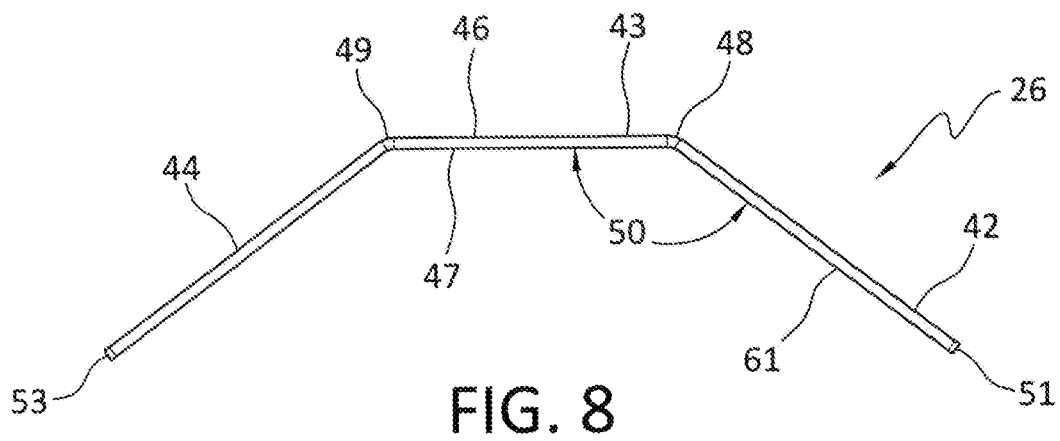
FIG. 8 is a side view of a roller assembly guard.

As shown in FIGS. 6, 7, and 8, guard 26 preferably has a front panel 42, a middle panel 43, and a rear panel 44. The middle panel 43 preferably has an opening 45 through which a portion of the wheel 23 extends. The opening 45 preferably has two lateral sides 20 opposite each other, as shown in FIGS. 2, 4, 5, 6, and 7. The middle panel 43 also has a top surface 46 that surrounds opening 45 and a bottom surface 47 that surrounds opening 45. The middle panel 43 also has a leading edge 48 and a trailing edge 49 opposite the leading edge 48. The leading edge 48 of middle panel 43 preferably faces the front edge When guard 26 is viewed from the side with the middle panel 43 in a horizontal position, as shown in FIG. 8, the front panel 42 extends on a downward slope from the leading edge 48 of middle panel 43. Similarly, the rear panel 44 extends on a downward slope from the trailing edge 49 of middle panel 43. The angle 50 of the downward slope of front panel 42 and rear panel 44 can vary and will depend on the length of front panel 42 and rear panel 44 and the height of wheel 23.

Figure 4:
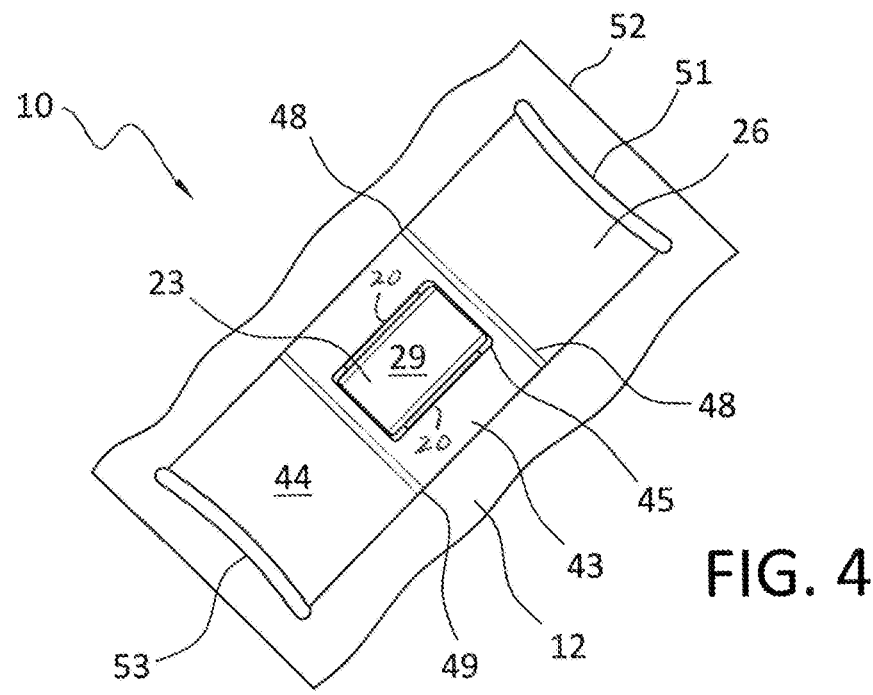
FIG. 4 is a top view of a roller assembly protected by a roller assembly guard.

Guard 26 is preferably attached directly to the casing spacer band 12, as shown in FIGS. 2, 3, and 4. The lower end 51 of front panel 42 of guard 26 is preferably attached to the casing spacer band 12 near the front edge 52 of casing spacer band 12 so that the front panel 42 is the first panel of guard 26 to encounter obstacles that may exist on the inner surface 14 of the casing pipe 11 when the casing spacer 10 is pushed into or pulled through a casing pipe 11. The lower end 53 of rear panel 44 of guard 26 is preferably attached to the casing spacer band 12 near the back edge 54 of casing spacer band 12.

As shown in FIG. 5, the gap 66 between the sides 28 of the wheel 23 and the opening 45 in middle panel 43 should be kept to a minimum to prevent any obstacles that may exist on the inner surface 14 of the casing pipe 11 from inadvertently lodging into the gap 66 as the guard 26 passes over the obstacle. The gap 66 is preferably 0.095 inches, but the gap 66 can be any distance suitable for a particular application. One method of minimizing the gap 66 is to place a thrust washer 67 between the sides 28 of the wheel 23 and the opening 45 in middle panel 43, as shown in FIG. 5. The thrust washers 67 also serve to protect the sides 28 of the wheel 23 from incidental contact with the guard 26, which could damage the wheel 23.

Figure 9:
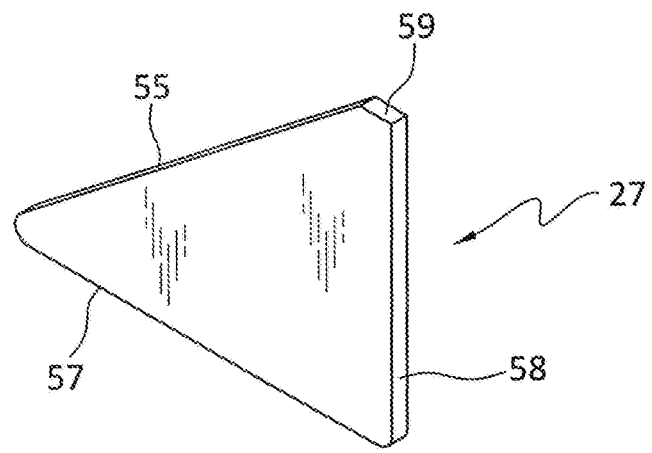
FIG. 9 is an isometric view of a gusset.

As shown in FIG. 3, the front panel 42 of guard 26 can be reinforced with at least one gusset 27. Gusset 27 can be made from a sheet of metal such as raw steel or stainless steel. Gusset 27 can be cut or punched from the sheet of metal in the desired shape shown in FIGS. 9, 10, and 11.

Figure 10:
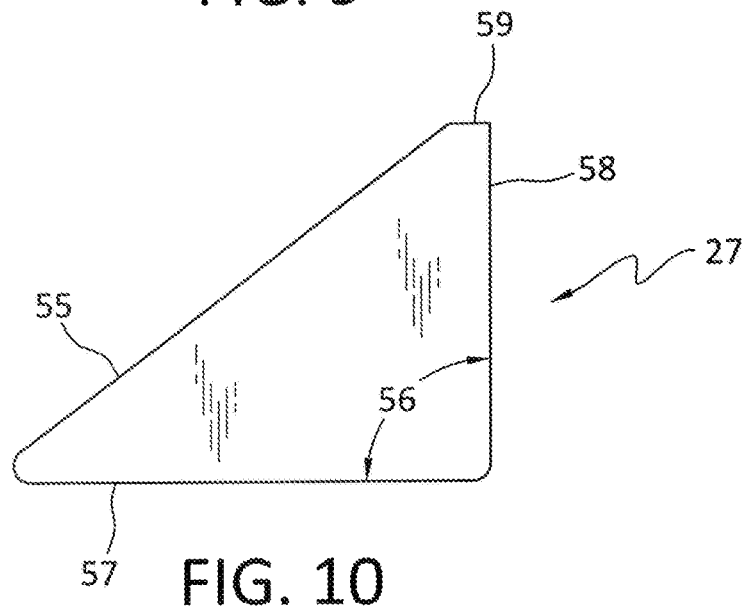
FIG. 10 is a side view of a gusset.
Figure 11:
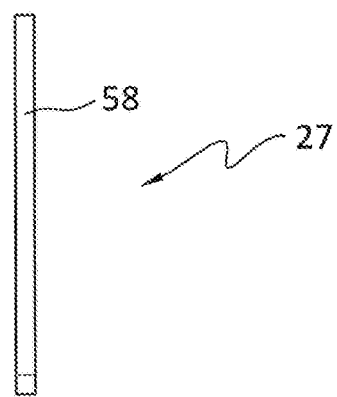
FIG. 11 is an end view of a gusset.

When gusset 27 is viewed from the side, as shown in FIG. 10, gusset 27 has the general shape of a right triangle, with a slanted edge 55 opposite a right angle 56, a bottom edge 57 adjacent to the right angle 56, and a side edge 58 adjacent to the right angle 56. The slanted edge 55 preferably has a relatively short section 59 near side edge 58. The short section 59 is substantially perpendicular to side edge 58 and substantially parallel to bottom edge 57.

As shown in FIG. 3, at least one gusset 27 is preferably positioned underneath guard 26, with the slanted edge 55 of gusset 27 in contact with front panel 42 of guard 26, the short section 59 of slanted edge 55 of gusset 27 in contact with middle panel 43 of guard 26 near leading edge 48 of front panel 43, and the bottom edge 57 of gusset 27 in contact with the casing spacer band 12. If one gusset 27 is used, then the one gusset 27 is preferably placed underneath the front panel 42 of guard 26 substantially equidistant from the two sides 60 of front panel 42. If two gussets 27 are used, then each gusset 27 is preferably placed underneath the front panel 42 of guard 26 near a side 60 of front panel 42. In any case, the gusset 27 or gussets 27 is/are secured in place by attaching (by welding or other similar means) the slanted edge 55 to bottom surface 61 of front panel 42 of guard 26 and by attaching (by welding or other similar means) the bottom edge 57 to the casing spacer band 12. An example of a weld bead 68 joining the slanted edge 55 to bottom surface 61 of front panel 42 is shown in FIG. 3. An example of a weld bead 69 joining bottom edge 57 to the casing spacer band 12 is shown in FIG. 3.

In an alternative embodiment, the caster 24 and the gusset 27 can be combined into one piece, as shown in FIGS. 12 and 13. The caster/gusset combination 62 can be made from a sheet of metal such as raw steel or stainless steel. The caster/gusset combination 62 can be cut or punched from the sheet of metal in the desired shape and then formed or bent into a U-shaped channel having a bottom 63 and two sides 64, as shown in FIG. 12. The caster/gusset combination 62 can also be made from three separate pieces of metal that are joined together into a U-shaped channel by welding or similar method. The caster/gusset combination 62 is preferably shaped to provide adequate clearances between the caster/gusset combination 62 and the sides 28 and rolling surface 29 of each wheel 23. The two sides 64 of the caster/gusset combination 62 have holes 65 to accommodate a bolt 36 for each wheel 23 assembled onto the caster/gusset combination 62.

When the caster/gusset combination 62 is viewed from the side, as shown in FIG. 14, the caster/gusset combination 62 has a trailing slanted edge 70, a top edge 71, a leading slanted edge 72, a bottom edge 73, a right angle 74, and a side edge 75. The top edge 71 is substantially parallel to bottom edge 73. The top edge 71 and the bottom edge 73 are substantially perpendicular to side edge 75.

The caster/gusset combination 62 can be positioned underneath guard 26, with the leading slanted edges 72 of caster/gusset combination 62 in contact with front panel 42 of guard 26, the top edges 71 of caster/gusset combination 62 in contact with middle panel 43 of guard 26, the trailing slanted edge 70 of caster/gusset combination 62 in contact with the rear panel 44 of guard 26, and the bottom edge 73 of caster/gusset combination 62 in contact with the casing spacer band 12. The caster/gusset combination 62 can be secured in place by attaching (by welding or other similar means) the leading slanted edges 72 of caster/gusset combination 62 to the front panel 42 of guard 26, the top edges 71 of caster/gusset combination 62 to the middle panel 43 of guard 26, the trailing slanted edge 70 of caster/gusset combination 62 to the rear panel 44 of guard 26, and the bottom edge 73 of caster/gusset combination 62 to the casing spacer band 12.

It is understood that one embodiment of the present invention has been disclosed by way of example and that other modifications and alterations may occur to those skilled in the art without departing from the scope and spirit of the present invention.

What is claimed is:

1. A casing spacer for positioning a carrier pipe inside a casing pipe, comprising:
    (a) a casing spacer band having an outer surface, a front edge, and a back edge opposite said front edge;
    (b) at least one roller assembly attached to said outer surface of said casing spacer band, said at least one roller assembly comprising:
        (i) a caster having a "U" shape consisting of a bottom and two opposing sides extending from said bottom, where said bottom attaches to said outer surface of said casing spacer band with said opposing sides extending radially from said bottom away from said casing spacer band, and where each opposing side has a hole axially aligned with said hole of said other opposing side;
        (ii) a wheel rotatably placed between said two opposing sides of said caster, said wheel having a bore and an axis of rotation aligned with said holes of said opposing sides, where said axis of rotation is substantially parallel to said front edge and said back edge of said casing spacer band, where said bore has an inner surface;
        (iii) a bolt extending through said bore of said wheel and said holes of said opposing sides of said caster, and a nut for securing said bolt to said opposing sides of said caster; and
    (c) a guard attached to said outer surface of said casing spacer band for protecting each said at least one roller assembly from obstacles inside said casing pipe.

2. The casing spacer of claim 1, where said guard has a front panel with two sides, a middle panel, and a rear panel, where said middle panel has an opening with two lateral sides opposite each other, where a portion of said wheel extends through said opening, where said middle panel has a leading edge facing said front edge of said casing spacer band, where said middle panel has a trailing edge opposite said leading edge and facing said rear edge of said casing spacer band, where said front panel of said guard has a first end and a second end, where said front panel of said guard extends on a downward slope from said leading edge of said middle panel toward said front edge of said casing spacer band, with said first end of said front panel attached to said leading edge of said middle panel and said second end of said front panel attached to said casing spacer band near said front edge of said casing spacer band, and where said rear panel of said guard has a first end and a second end, where said rear panel of said guard extends on a downward slope from said trailing edge of said middle panel toward said back edge of said casing spacer band, with said first end of said rear panel attached to said trailing edge of said middle panel and said second end of said rear panel attached to said casing spacer band near said back edge of said casing spacer band.

3. The casing spacer of claim 2, further comprising a gusset for providing structural support for said front panel and said middle panel of each said guard, said gusset having a general shape of a right triangle with a slanted edge opposite a right angle, a bottom edge adjacent to said right angle, and a side edge adjacent to said right angle, where said slanted edge has a short section near said side edge, said short section being substantially perpendicular to said side edge and substantially parallel to said bottom edge, where said slanted edge of said gusset is positioned under said front panel of said guard equidistant from said two sides of said front panel.

4. The casing spacer of claim 3, where said slanted edge of said at least one gusset is in contact with said front panel of said guard, where said short section of said slanted edge is in contact with said middle panel of said guard near said leading edge of said front panel, and where said bottom edge of said at least one gusset is in contact with said casing spacer band.

5. The casing spacer of claim 4, where said casing spacer band includes at least two sections, with each section having an outer surface, a front edge, a back edge opposite said front edge, and two short ends opposite each other and substantially perpendicular to said front edge and said back edge, where said short ends are bent outward to form a flange for joining adjacent sections of said casing spacer band.

6. The casing spacer of claim 5, where said wheel is made of an electrically isolating glass-filled polymer material.

7. The casing spacer of claim 6, further comprising at least one needle bearing located between said bolt and said inner surface of said bore of said wheel.

8. The casing spacer of claim 7, further comprising a thrust washer installed around said bolt on each side of said wheel to fit between said wheel and each lateral side of said opening in said middle panel of said guard.

9. The casing spacer of claim 2, further comprising two gussets for providing structural support for said front panel and said middle panel of each said guard, said gussets having a general shape of a right triangle with a slanted edge opposite a right angle, a bottom edge adjacent to said right angle, and a side edge adjacent to said right angle, where said slanted edge has, a short section near said side edge, said short section being substantially perpendicular to said side edge and substantially parallel to said bottom edge, where said slanted edge of one said gusset is positioned under said front panel of said guard near one side of said front panel and said slanted edge of another said gusset is positioned under said front panel of each said guard near another side of said front panel.

10. The casing spacer of claim 9, where said slanted edge of both gussets is in contact with said front panel of said guard, where said short section of said slanted edge is in contact with said middle panel of said guard near said leading edge of said front panel, and where said bottom edge of both gussets is in contact with said casing spacer band.

11. The casing spacer of claim 10, where said casing spacer band includes at least two sections, with each section having an outer surface, a front edge, a back edge opposite said front edge, and two short ends opposite each other and substantially perpendicular to said front edge and said back edge, where said short ends are bent outward to form a flange for joining adjacent sections of said casing spacer band.

12. The casing spacer of claim 11, where said wheel is made of an electrically isolating glass-filled polymer material.

13. The casing spacer of claim 12, further comprising at least one needle bearing located between said bolt and said inner surface of said bore of said wheel.

14. The casing spacer of claim 13, further comprising a thrust washer installed around said bolt on each side of said wheel to fit between said wheel and each lateral side of said opening in said middle panel of said guard.

15. A casing spacer for positioning a carrier pipe inside a casing pipe, comprising:
  (a) a casing spacer band having an outer surface, a front edge, and a back edge opposite said front edge;
  (b) at least one roller assembly attached to said outer surface of said casing spacer band, said at least one roller assembly comprising:
    (i) a caster having a "U" shape consisting of a bottom and two opposing sides extending from said bottom, where said bottom attaches to said outer surface of said casing spacer band with said opposing sides extending radially from said bottom away from said casing spacer band, where each opposing side has a hole axially aligned with said hole of said other opposing side, where each opposing side has a trailing slanted edge, a top edge, a leading slanted edge, a bottom edge, a right angle, and a side edge that can function as a support gusset;
    (ii) a wheel rotatably placed between said two opposing sides of said caster, said wheel having a bore and an axis of rotation aligned with said holes of said opposing sides, where said axis of rotation is substantially parallel to said front edge and said back edge of said casing spacer band, where said bore has an inner surface;
    (iii) a bolt extending through said bore of said wheel and said holes of said opposing sides of said caster, and a nut for securing said bolt to said opposing sides of said caster; and
  (c) a guard attached to said outer surface of said casing spacer band for protecting each said at least one roller assembly from obstacles inside said casing pipe.

16. The casing spacer of claim 15, where said guard has a front panel with two sides, a middle panel, and a rear panel, where said middle panel has an opening with two lateral sides opposite each other, where a portion of said wheel extends through said opening, where said middle panel has a leading edge facing said front edge of said casing spacer band, where said middle panel has a trailing edge opposite said leading edge and facing said rear edge of said casing spacer band, where said front panel of said guard has a first end and a second end, where said front panel of said guard extends on a downward slope from said leading edge of said middle panel toward said front edge of said casing spacer band, with said first end of said front panel attached to said leading edge of said middle panel and said second end of said front panel attached to said casing spacer band near said front edge of said casing spacer band, and where said rear panel of said guard has a first end and a second end, where said rear panel of said guard extends on a downward slope from said trailing edge of said middle panel toward said back edge of said casing spacer band, with said first end of said rear panel attached to said trailing edge of said middle panel and said second end of said rear panel attached to said casing spacer band near said back edge of said casing spacer band.

17. The casing spacer of claim 16, where said leading slanted edges of said two opposing sides of said caster are positioned under said front panel of a said guard and said leading slanted edges are in substantial contact with said front panel of said guard to provide structural support, where said trailing slanted edges of said two opposing sides of said caster are positioned under said rear panel of said guard and said trailing slanted edges are in substantial contact with said rear panel of said guard to provide structural support, and where said top edges of said two opposing sides of said caster are positioned under said middle panel of said guard and said top edges are in substantial contact with said middle panel of said guard to provide structural support.

18. The casing spacer of claim 17, where said casing spacer band includes at least two sections, with each section having an outer surface, a front edge, a back edge opposite said front edge, and two short ends opposite each other and substantially perpendicular to said front edge and said back edge, where said short ends are bent outward to form a flange for joining adjacent sections of said casing spacer band.

19. The casing spacer of claim 18, where said wheel is made of an electrically isolating glass-filled polymer material.

20. The casing spacer of claim 19, further comprising at least one needle bearing located between said bolt and said inner surface of said bore of said wheel.

21. The casing spacer of claim 20, further comprising a thrust washer installed around said bolt on each side of said wheel to fit between said wheel and each lateral side of said opening in said middle panel of said guard.

\* \* \* \* \*